(12) United States Patent
Wang et al.

(10) Patent No.: US 10,967,605 B2
(45) Date of Patent: Apr. 6, 2021

(54) DECORATIVE LAMINATES HAVING AN OPEN-CELL FOAM LAYER

(71) Applicant: The Boeing Company, Chicago, IL (US)

(72) Inventors: Xiaoxi Wang, Mukilteo, WA (US); Jason W. Drexler, Brier, WA (US); John Christopher Wilde, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 15/461,868

(22) Filed: Mar. 17, 2017

(65) Prior Publication Data

US 2018/0264776 A1    Sep. 20, 2018

(51) Int. Cl.
*B32B 5/18* (2006.01)
*B32B 7/12* (2006.01)
(Continued)

(52) U.S. Cl.
CPC .............. *B32B 5/18* (2013.01); *B32B 7/06* (2013.01); *B32B 7/12* (2013.01); *B32B 27/065* (2013.01); *B32B 27/08* (2013.01); *B32B 27/281* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 29/007* (2013.01); *B32B 37/12* (2013.01); *B32B 2250/03* (2013.01); *B32B 2250/04* (2013.01); *B32B 2250/05* (2013.01); *B32B 2250/24* (2013.01); *B32B 2255/062* (2013.01); *B32B 2255/102* (2013.01); *B32B 2255/26* (2013.01); *B32B 2266/025* (2013.01); *B32B 2266/0207* (2013.01); *B32B 2266/0228* (2013.01); *B32B 2266/0235* (2013.01); *B32B 2266/0242* (2013.01);
(Continued)

(58) Field of Classification Search
CPC ..... B32B 5/18; B32B 2266/06; B32B 29/007; B32B 7/12; B32B 2266/045
See application file for complete search history.

(56) References Cited

U.S. PATENT DOCUMENTS 4,056,161 A * 11/1977 Allen, Jr. ............. G10K 11/168
                                              181/290
2003/0226637 A1* 12/2003 David ..................... B44C 1/10
                                              156/212

(Continued)

FOREIGN PATENT DOCUMENTS

WO        0206900        1/2002
WO     2011039298        7/2011

OTHER PUBLICATIONS

European Patent Office, "Extended European Search Report," issued in connection with European Patent Application No. 18161213.6, dated Jun. 4, 2018, 6 pages.

(Continued)

*Primary Examiner* — Hai Vo
(74) *Attorney, Agent, or Firm* — Hanley, Flight & Zimmerman, LLC

(57) ABSTRACT

Decorative laminates having an open-cell foam layer are disclosed herein. An example decorative laminate includes a decorative layer, an open-cell foam layer coupled to the decorative layer and an adhesive layer coupled to the open-cell foam layer.

20 Claims, 3 Drawing Sheets

(51) Int. Cl.
  *B32B 27/08* (2006.01)
  *B32B 27/06* (2006.01)
  *B32B 27/36* (2006.01)
  *B32B 29/00* (2006.01)
  *B32B 27/30* (2006.01)
  *B32B 7/06* (2019.01)
  *B32B 27/34* (2006.01)
  *B32B 27/32* (2006.01)
  *B32B 27/28* (2006.01)
  *B32B 37/12* (2006.01)

(52) U.S. Cl.
  CPC .......... *B32B 2266/0257* (2013.01); *B32B 2266/0264* (2013.01); *B32B 2266/04* (2013.01); *B32B 2266/045* (2013.01); *B32B 2266/057* (2016.11); *B32B 2266/06* (2013.01); *B32B 2307/31* (2013.01); *B32B 2307/4023* (2013.01); *B32B 2307/41* (2013.01); *B32B 2307/558* (2013.01); *B32B 2307/724* (2013.01); *B32B 2307/732* (2013.01); *B32B 2307/75* (2013.01); *B32B 2309/105* (2013.01); *B32B 2405/00* (2013.01); *B32B 2451/00* (2013.01); *B32B 2590/00* (2013.01); *B32B 2605/08* (2013.01); *B32B 2605/10* (2013.01); *B32B 2605/12* (2013.01); *B32B 2605/18* (2013.01); *B32B 2607/00* (2013.01)

(56) References Cited

U.S. PATENT DOCUMENTS

| | | | |
|---|---|---|---|
| 2003/0228338 A1* | 12/2003 | Martinez | A45D 37/00 424/401 |
| 2006/0277807 A1* | 12/2006 | Wilde | B60R 13/0815 40/606.07 |
| 2009/0145542 A1* | 6/2009 | Zoller | C09J 7/403 156/249 |
| 2011/0031059 A1* | 2/2011 | Parish | A61F 11/08 181/129 |
| 2011/0300361 A1* | 12/2011 | Nakayama | C09J 7/29 428/220 |
| 2012/0237759 A1* | 9/2012 | Ehbing | B32B 5/08 428/319.3 |
| 2014/0099485 A1* | 4/2014 | Narendrnath | H01L 21/67092 428/201 |
| 2016/0089851 A1 | 3/2016 | Drexler et al. | |
| 2016/0250828 A1 | 9/2016 | Wilde et al. | |
| 2017/0174944 A1* | 6/2017 | Kato | C09J 133/08 |
| 2018/0257346 A1* | 9/2018 | Austin | C03C 27/10 |

OTHER PUBLICATIONS

European Patent Office, "Communication pursuant to Article 94(3) EPC", issued in connection with application No. 18161213.6 dated Apr. 30, 2019, 4 pages.

European Patent Office, "Summons to attend oral proceedings pursuant to Rule 115(1) EPC", issued in connection with application No. 18161213.6 dated Dec. 18, 2019, 7 pages.

European Patent Office, "Summons to attend oral proceedings pursuant to Rule 115(1) EPC", issued in connection with application No. 18161213.6 dated Jan. 28, 2020, 7 pages.

\* cited by examiner

US 10,967,605 B2

DECORATIVE LAMINATES HAVING AN OPEN-CELL FOAM LAYER

FIELD OF THE DISCLOSURE

This disclosure relates generally to decorative laminates and, more particularly, to decorative laminates having an open-cell foam layer.

BACKGROUND

Vehicles (e.g., mass transit vehicles, tractor-trailers, personal automobiles, etc.), buildings and/or other structures (e.g., billboards) include surfaces that are visible to people. These surfaces often include decorative images for aesthetic, informational and/or advertising purposes. For example, some interior surfaces of aircraft and/or other mass transit vehicles (e.g., buses, trains, ships, etc.) include decorative images that identify the mass transit provider (e.g., an airline carrier) and/or advertise for another entity, product or service. In some instances, the decorative images are formed by a decorative laminate that is coupled to a surface of the vehicle, building and/or other structure.

SUMMARY

An example decorative laminate includes a decorative layer, an open-cell foam layer coupled to the decorative layer, and an adhesive layer coupled to the open-cell foam layer.

An example method to produce a decorative laminate includes coupling an open-cell foam layer to a decorative layer and coupling an adhesive layer to the open-cell foam layer.

An example method of applying a decorative laminate includes exposing an adhesive layer of the decorative laminate, where the decorative laminate includes an open-cell foam layer coupled to the adhesive layer and a decorative layer coupled to the open-cell foam layer, and applying the decorative laminate structure to a panel.

Figure 1:
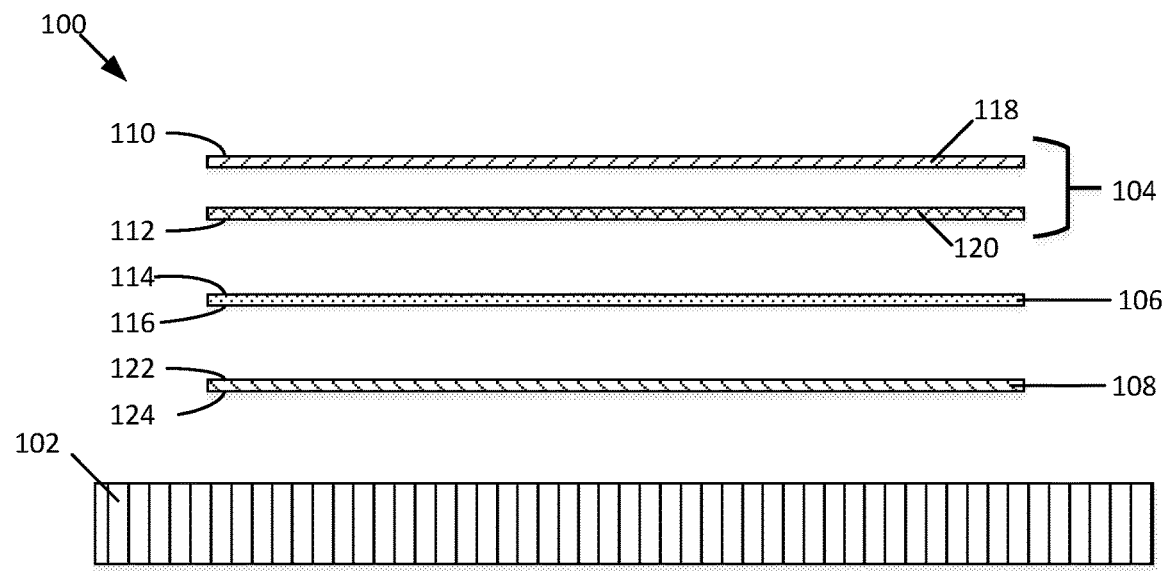
FIG. 1 is an exploded side view of an example decorative laminate constructed in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used herein, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Surfaces in public spaces (e.g., billboards, building walls, vehicle panels, etc.) oftentimes include decorative images for aesthetic, informational, and/or advertising purposes. Some known aircraft and/or other mass transit vehicles (e.g., buses, trains, ships, etc.) include decorative images (e.g., a decorative pattern such as wood grain, words, a logo, etc.) on their surfaces for aesthetic, informational and/or advertising purposes. For example, interior surfaces of mass transit vehicles may include decorative images that identify the mass transit provider (e.g., an airline carrier) and/or advertise for another entity, product or service. In some examples, the decorative images are formed by a decorative laminate that is coupled to the interior surface of the vehicle.

Many known decorative laminates are formed by a plurality of layers that are coupled together. For example, some known decorative laminates include a support or base layer, a decorative layer coupled to the top of the base layer, and an adhesive layer coupled to the bottom of the base layer. The base layer provides support for the decorative layer, which may include printed ink and/or textures in the form of embossing. The adhesive layer is used to couple the decorative laminate to a surface.

When applying known decorative laminates to a surface, gases (e.g., air) can be trapped and/or form under the adhesive layer during application of the decorative laminate to the surface, which may create bubbles and/or imperfections in the decorative laminate. Trapped gas can form from handling during manufacturing or from outgassing of the laminate materials or underlying panel materials over time. These bubbles are aesthetically displeasing and often lead to replacing the decorative laminate with a new laminate. To prevent bubbles from forming, some known decorative laminates utilize a breathable base layer, such a woven material. However, woven materials often produce an undesired pattern in the decorative laminate referred to as moire. This effect is aesthetically displeasing, especially when the decorative laminate is attempting to present a different texture or pattern (e.g., wood grain). Other known decorative laminates use non-woven materials that are constructed of a plurality of un-oriented fibers or strands (e.g., fiber glass). However, when removing a liner from the adhesive layer (before applying the decorative laminate to a surface) or attempting to remove the decorative laminate from the underlying surface for replacement (and/or another reason), the non-woven material often separates or tears. In other words, the non-woven material often lacks the cohesive strength to allow the decorative laminate to be removed from the underlying surface without tearing. As a result, pieces of the non-woven material and/or the adhesive may remain adhered to the underlying surface. In some cases, a technician has to manually remove/clean the remaining pieces from the underlying surface before applying a new decorative laminate, which would otherwise prevent proper adhesion of the new decorative laminate to the underlying surface. For example, removal may include cleaning of the residual adhesive layer using a solvent and/or scrapers, minor repair to the surface, and applying a new decorative laminate. In some instances, such as with panels in an aircraft, a flight test is conducted to ensure the acceptability of a decorative laminate. Thus, this process can be extremely time consuming and expensive. In some cases, rather than attempting to remove all of the remnants of the torn decorative laminate, the entire panel is replaced, which is likewise costly and inefficient.

Disclosed herein are example decorative laminates having an open-cell foam layer. The open-cell foam layer provides a breathable (e.g., permeable) base layer that enables gasses to vent to atmosphere while also maintaining structural integrity that prevents ripping and tearing as may occur with known base layers. In general, an open-cell foam includes a plurality of cells (commonly referred to as pores or cavities) that interlock or interconnect and which are defined by walls or structures of the material that forms the foam layer. The connecting cells form passageways that vent to the outer surfaces of the material. Thus, the open-cell foam advantageously enables air (e.g., gas bubbles) to travel through the open-cell foam layer, thereby venting any gas/air bubbles that may form beneath the decorative laminate. The gas may escape transversely (along the plane) through the sides of the open-cell foam layer and/or through a top decorative layer, which may also be breathable.

Also, unlike woven or non-woven materials, the open-cell foam layer is formed of a substantially continuous or singular material. As such, when removing the decorative laminate from a surface such as a panel in an aircraft or removing a liner from the decorative laminate, the open-cell foam layer is less likely to separate or tear than known decorative laminates using woven or non-woven fibers. Thus, less time and money is spent cleaning a surface from which the decorative laminate has been removed.

Some example decorative laminates disclosed herein include a decorative layer coupled to the top of the open-cell foam layer. The decorative layer may include one or more layers that provide a decorative effect and may include an ink composition, an embossing layer, a top sheet, etc. Additionally, some example decorative laminates disclosed herein include an adhesive layer coupled to the bottom of the open-cell foam layer. As such, the decorative laminate can be coupled to a surface of a panel. As used herein, the term "panel" refers to any structure with a surface capable of receiving a decorative laminate such as, for example, an interior wall section in an aircraft cabin, an exterior wall of a fuselage of an aircraft, an interior wall section of a vehicle (e.g., a car, a truck, a mass transit vehicle such as a bus or train, etc.), etc.

In some examples, the size of the cells of the open-cell foam layer are approximately 1 nanometer (nm)-1 millimeter (mm). The size of a cell is the diameter of the cell or distance across the cell. Open-cell foam is often defined or characterized by an open-cell content of the material. As used herein, the term "open-cell content" means the volume percentage of cells that are interconnected and vented to the outer surface of the material. For example, an open-cell foam having an open-cell content of 50% means half of the volume of cells are interconnected and vented to atmosphere. An open-cell content of 100% means that all of the cells in the material are interconnected and vented to atmosphere. In some examples disclosed herein, the open-cell content of the open-cell foam layer is at least approximately 50%. In other examples, the open-cell foam may have an open-cell content of approximately 10%-100%. Open-cell foam can also be defined by void fraction. As used herein, the term "void fraction" means the volume percentage of the cells (e.g., the void or space) as compared to the total volume of the open-cell foam material. In some examples, the open-cell foam layer may have a void fraction of approximately 10%-98%. The cell size, open-cell content and void fraction values ensure the open-cell foam layer sufficiently vents gas bubbles to atmosphere while still maintaining the structural integrity of the open-cell foam material.

Further, unlike woven materials, open-cell foam does not have a repeating pattern and, thus, can be formed into various textures or patterns without creating moire or mixed pattern issues. Therefore, the example decorative laminates disclosed herein can achieve better aesthetic results than known decorative laminates. Additionally, open-cell foam is naturally opaque, which creates an even and non-transparent backing for the decorative layer. As such, the open-cell foam layer can effectively hide any unattractive and/or otherwise unappealing features of the underlying surface that may otherwise show through the decorative layer and negatively affect the decorative effect. Other known decorative laminates add colorant or dye such as talc to the base layer (which is transparent). As such, the example decorative laminates disclosed herein require less processing/manufacturing steps, thereby decreasing manufacturing time and costs.

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via one or more intermediate object(s) (e.g., layer(s)) that are positioned between the first and second objects. Further, as used herein, the terms "apply," "applied," and "application of" also refer to a direct or indirect attachment of one object to another object (e.g., one layer to another layer).

Figure 2:
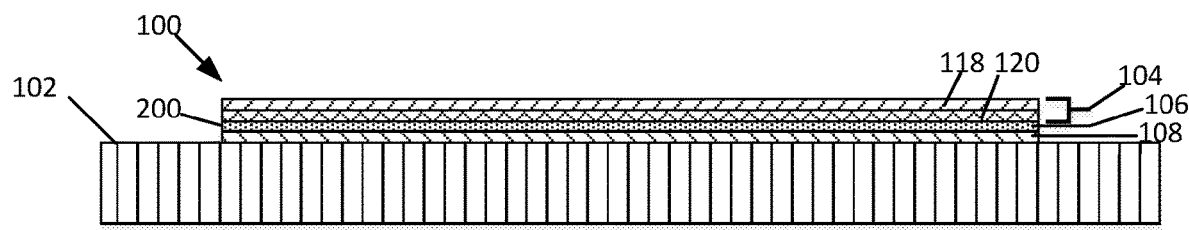
FIG. 2 is an assembled side view of the example decorative laminate of FIG. 1 coupled to an example panel.

Turning now to the figures, FIGS. 1 and 2 illustrate an example decorative laminate 100 constructed in accordance with one or more principles of this disclosure. In particular, FIG. 1 is an exploded side view of the example decorative laminate 100 and FIG. 2 is an assembled side view of the example decorative laminate 100 coupled to a panel 102. The panel 102 may be, for example, a surface of an aircraft (e.g., an interior cabin surface), a surface of a mass transit vehicle (e.g., inside a railway car), etc.

In the illustrated example of FIGS. 1 and 2, the decorative laminate 100 includes multiple layers that form the decorative laminate 100. For example, the decorative laminate 100 of the illustrated example includes a decorative layer 104, an open-cell foam layer 106, and an adhesive layer 108. The decorative layer 104 includes a decorative effect (e.g., an ink composition and/or textures), as described in further detail here, and the foam layer 106 acts as the base or support layer that carries the decorative layer 104. As illustrated in FIG. 1, the decorative layer 104 has a first side 110 (e.g., a top side) and a second side 112 (e.g., a bottom side) opposite the first side 110, and the foam layer 106 has a first side 114 (e.g., a top side) and a second side 116 (e.g., a bottom side) opposite the first side 114. The second side 112 of the decorative layer 104 is to be coupled to the first side 114 of the foam layer 106.

In some examples, the decorative layer 104 includes a plurality of sub-layers. For example, in the illustrated example of FIGS. 1 and 2, the decorative layer 104 includes a top sheet layer 118 (e.g., a clear cap or protective layer) and an embossing resin layer 120. The embossing resin layer 120 includes an embossed surface that forms a decorative effect (e.g., texture of wood grain). In some examples, the embossing resin layer 120 includes a low heat release resin and/or an embossable polymeric material, such as a thermosetting resin. The thermosetting resin may include polyesters, polyurethanes, and/or or any other suitable thermoset resin. Additionally or alternatively, the embossing resin layer 120 may be constructed of a thermoplastic resin including polypropylene (PP), polyethylene (PE), polyethylene terephthalate (PET), polytrimethylene terephthalate (PTT), polyamide (PA), polyetherimide (PEI), polyvinyl chloride (PVC), polycarbonate, polymethyl methacrylate and/or any other suitable thermoplastic resin.

In some examples, the decorative layer 104 includes an ink composition (e.g., an ink layer). The ink composition may include a printing ink, a pigmented medium including a colored ink or a stain, a silk screen print, a digital print, a paint, or any other suitable decorative material. The ink composition may be applied to the embossing resin layer 120 and/or to the top sheet layer 118 via screen printing, silk screening, flexographic silk screening, ink-jet printing, laser screen printing, digital printing, ultraviolet and electronic bean printing, painting and/to any other suitable printing or application process or method. For example, the ink composition may be printed onto the bottom of the top sheet layer 118 and capped on the sides. In some examples, the example top sheet layer 118 covers and protects the other layers (e.g., the embossing resin layer 120, the foam layer 106, the ink composition, etc.). For example, the top sheet layer 118 may protect the ink during cleaning. In some examples, the top sheet layer 118 is an optically clear or semi-clear outer layer. For example, the top sheet layer 118 may be a transparent thermoplastic polymer such as a polyvinyl fluoride-based material. As a result, the decorative effect of the ink composition is visible through the top sheet layer 118. In other examples, the top sheet layer 118 may include an integral color, such that no ink is involved. While in the illustrated example the decorative layer 104 includes two layers, in other examples the decorative layer 104 may include more or fewer layers. For example, when no ink is used, the decorative layer 104 may not include a top sheet layer. In some such examples, the embossing resin layer 120 is cleanable.

To attach the decorative laminate 100 to the panel 102, the example decorative laminate 100 includes the adhesive layer 108. The adhesive layer 108 has a first side 122 (e.g., a top side) and a second side 124 (e.g., a bottom side) opposite the first side 122. The first side 122 of the adhesive layer 108 is coupled to the second side 116 of the foam layer 106. The adhesive may be a pressure sensitive adhesive (PSA), a hot melt adhesive, a spay adhesive or any other suitable adhesive. In some examples, using a PSA is advantageous because it enables decorative laminate 100 to be easily coupled to the panel 102 by pressing on the decorative laminate 100 (e.g., hand-pressed onto the panel 102). Thus, as compared to other types of adhesives, additional processing steps (e.g., heating) to activate the adhesive material are not required. In some examples, the example adhesive layer 108 is permeable or breathable (e.g., includes built-in venting pathways). An example permeable adhesive layer that may be implemented as the example adhesive layer 108 is disclosed in U.S. application Ser. No. 15/397,460, titled "Methods and Apparatus to Form Venting Pathways in Pressure Sensitive Adhesives for Laminate Stacks," filed Jan. 3, 2017, and which is incorporated herein by this reference in its entirety. An example pressure sensitive adhesive layer disclosed in U.S. application Ser. No. 15/397,460 includes venting pathways that extend randomly through the thickness of the pressure sensitive adhesive layer. U.S. application Ser. No. 15/397,460 discloses an example manner of altering a pressure sensitive adhesive resin to be used in a laminate stack that includes adding fibers to the pressure sensitive adhesive resin. As the laminate stack is applied to a bonding surface (e.g., a panel of an aircraft), any air trapped between the pressure sensitive adhesive layer and the bonding surface causes localized strain on the pressure sensitive adhesive layer, which causes the formation of voids adjacent to the fibers. Such voids are interconnected to form venting pathways to enable gas to pass through the pressure sensitive adhesive layer. U.S. application Ser. No. 15/397,460 also discloses an example manner of altering a pressure sensitive adhesive resin to be used in a laminate stack includes that includes adding particulate to the pressure sensitive adhesive resin, which causes the formation of venting pathways in the pressure sensitive adhesive layer similar to the manner in which the fibers cause the formation of venting pathways in the pressure sensitive adhesive layer described above. The example adhesive layer 108 may be, for example, an acrylic-based adhesive, a rubber-based adhesive and/or a silicone-based adhesive.

The foam layer 106 is constructed of an open-cell foam. The open-cell foam may be, for example, metal, ceramic, polyetherimide (PEI), glass, butyl rubber, ethylene-vinyl acetate (EVA), nitrile, silicone rubber, vinyl ether, styrene block copolymer (SBC), a natural material such as natural rubber and/or any other suitable material. The open-cell foam has a plurality of cells. Some or all of the cells interconnect, thereby forming passageways through the material that vent to the edges and face of the open-cell foam. As such, if air bubbles form between the adhesive layer 108 and the panel 102 and/or between the adhesive layer 108 and the foam layer 106, the air bubbles can escape through the cells of the open-cell foam and vent to the atmosphere. In some examples, the adhesive layer 108 is breathable, which enables gas to pass to the foam layer 106. In some examples, the decorative layer 104 is also breathable such that gas can pass through all of the layers of the decorative laminate 100. In other examples, the decorative layer 104 is not breathable. In such examples, gas is vented transversely (in plane) to the edges (e.g., an edge 200 (FIG. 2)) of the foam layer 106.

In some examples, the cells of the open-cell foam have sizes of approximately 1 nm-1 mm. This range ensures that the cells are large enough to sufficiently vent gas between cells (e.g., without significantly restricting gas flow) while still leaving enough material intact to maintain the structural integrity of the foam. Additionally, this range may avoid creating a mark-off defect, such as an internal cellular structure feature that shows up on the visible surface and creates an undesired pattern. However, with stronger foams such as open-cell metal foam or ceramic foam, the cells may be up to approximately 6.35 mm (0.25 inches (in)) without creating mark-off defect. In some examples, the foam layer 106 has a thickness of approximately 0.01 mm-10 mm (or approximately 0.004 in-0.39 in). This range ensures sufficient venting to prevent bubbles from forming without being unnecessarily thick. In some examples, greater thicknesses (e.g., closer to 10 mm) provide better acoustic insulation, thermal insulation and impact resistance, which may be desirable depending on the application.

The volume percentage of the interconnected pores is referred to as the open-cell content. In some examples, the open-cell foam of the foam layer 106 has an open-cell content of at least approximately 50%, which provides sufficient interconnectedness of the pores to vent gasses that may form. A typical industry standard for testing the open-cell content of a material is the ASTM D6226 (American Society for Testing and Materials). At 50%, for example, half of the volume of the cells are open cells that are interconnected and vented to the outer surfaces of the material. At 100%, for example, open-cell content, every cell is interconnected and vented to the outer surfaces. Thus, only the struts of the material are between the pores. Even with a 100% open-cell content, some material can still maintain mechanical integrity. For example, metal foam or ceramic foam with 100% open-cell content are sufficiently integral and strong to act as a base substrate of the decorative laminate 100. In other examples, the open-cell content of the open-cell foam may be less than 50%. For example, in some instances, the open-cell foam may have an open-cell content of approximately 10%-100%.

In some examples, the open-cell foam of the foam layer 106 has a void fraction of approximately 10%-98%, which ensures sufficient pathways to vent the gasses but also enough structure to maintain good intrinsic mechanical integrity. For example, stronger open-cell foams, such as ceramic or PEI open-cell foams can have a void fraction as high as 94% while still maintaining good intrinsic mechanical integrity.

While in the illustrated example of FIGS. 1 and 2 the foam layer 106 is substantially flat or planar, in other examples the open-cell foam may be formed into various patterns. Unlike woven material, open-cell foam does not create moire or mixed pattern issues. Thus, the open-cell foam produces a more aesthetically pleasing result. Further, in some examples, using an open-cell foam for the foam layer 106 is advantageous because open-cell foams are naturally opaque. As such, the open-cell foam creates a more even surface that blocks out the color of the underlying surface (e.g., the panel 102), which may otherwise show through the decorative laminate 100. Other known decorative laminates have transparent base layers and the panel material often shows through to the decorative layer, which can negatively affect the quality of the decorative effect provided by the decorative layer 104. Therefore, additional processes like adding talc or other color dyes to the base layer are necessary. Thus, using an open-cell foam results in reduced manufacturing time and costs.

While in the illustrated example the decorative laminate 100 includes the decorative layer 104, the foam layer 106 and the adhesive layer 108, in other examples, the decorative laminate 100 may include more or fewer layers. For example, the decorative laminate 100 may include a flame retardant layer. In some such examples, the flame retardant layer may be disposed between the foam layer 106 and the adhesive layer 108. Additionally or alternatively, the decorative laminate 100 may not include the adhesive layer 108. Instead, foam layer 106 and the decorative layer 104 may be coupled to the panel 102 in other manners, such as with mechanical fasteners, magnets, static cling, Velcro®, etc.

Figure 3:
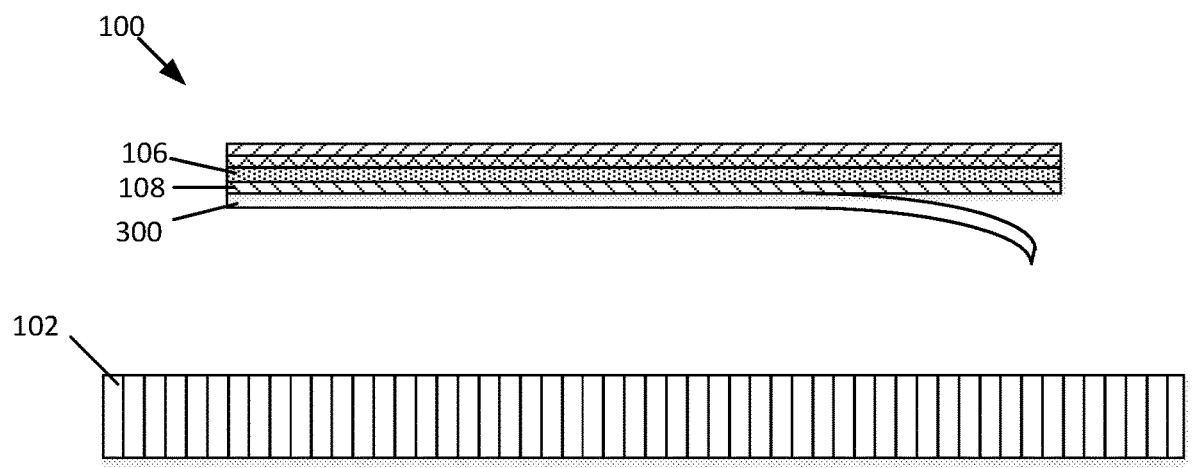
FIG. 3 illustrates an example liner used to cover an example adhesive layer of the example decorative laminate of FIGS. 1 and 2.

In some examples, the decorative laminate 100 may include a backing or liner on the adhesive layer 108 that is removed before applying the decorative laminate 100 to a panel (e.g., the panel 102). For example, as illustrated in FIG. 3, a liner 300 is coupled to the adhesive layer 108 (e.g., the bottom of the decorative laminate 100). The liner 300 may be constructed of, for example, paper (e.g., Super Calendered Kraft Paper), plastic film (e.g. PET or PP), and/or poly coated paper (e.g., wax or silicone coated). The liner 300 protects the adhesive layer 108 from unintentionally adhering (sticking) to other surfaces and also maintains a cleanness and tackiness quality of the adhesive layer 108. The liner 300 may be peeled away from the adhesive layer 108 to expose the adhesive layer 108, which may then be placed against the panel 102 to couple the decorative laminate 100 to the panel 102. As mentioned above, as compared to a non-woven material constructed of a plurality of individual fibers, the foam layer 106 is constructed of a substantially single structure. As such, the foam layer 106 is less likely to tear or separate when removing the liner 300 from the adhesive layer 108, as can occur in known decorative laminates.

Figure 4:
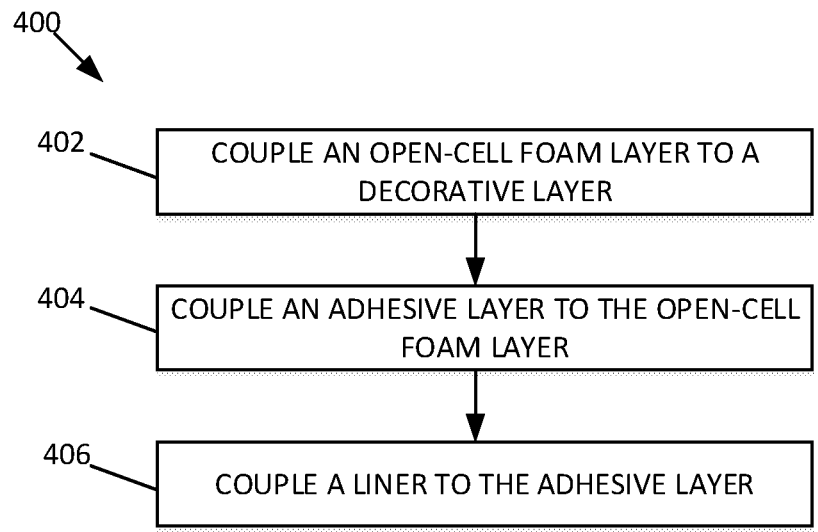
FIG. 4 is a flowchart representative of an example method to produce the example decorative laminate of FIG. 1.

FIG. 4 is a flowchart representative of an example method 400 that may be performed to produce a decorative laminate, such as the example decorative laminate 100 of FIGS. 1-3. The example method 400 includes coupling an open-cell foam layer to a decorative layer (block 402). For example, with reference to FIGS. 1 and 2, the foam layer 106 is coupled to the second side 112 (e.g., the bottom side) of the decorative layer 104. In some examples, a press forming process is used to heat and cure the decorative layer 104 (e.g., the top sheet layer 118 and the embossing resin layer 120) and the foam layer 106 at an effective elevated temperature (e.g., 300-330 degrees Fahrenheit (° F.)) and an effective pressure (e.g., 100 pounds-per-square-inch (psi)) for an effective period (e.g., 10-30 minutes) of time. The temperature, time and pressure may be based on the materials in the layers. In some examples, the decorative layer 104 and the foam layer 106 are layered and laid up on a flat configuration, such as a flat metal caul plate or the like, in large sheets. The large sheets are heated and cured in a multiple opening press, such as with flat platens, used in the press forming process. In other examples, heat and pressure may be applied to the decorative layer 104 and the foam layer 106 using a heated nip roller, which compresses the laminate stack between a series (e.g., two or more) heated rollers. The stacked decorative layer 104 and foam layer 106 are then cooled.

In some examples, the decorative laminate includes an adhesive layer. In such examples, the method 400 includes coupling an adhesive layer to the open-cell foam layer (block 402). For example, with reference to FIGS. 1 and 2, the adhesive layer 108 is coupled to the second side 116 (e.g., the bottom side) of the foam layer 106. In some examples, the adhesive layer 108 is stacked with the decorative layer 104 and the foam layer 106 in the heating/pressure process. In other examples, the adhesive layer 108 is added via a separate process. In some examples, a liner or backing may be used to protect the adhesive layer. In such an example, the method 400 includes coupling a liner to the adhesive layer (block 406). For example, with reference to FIG. 3, the liner 300 is coupled to the adhesive layer 108.

Figure 5:
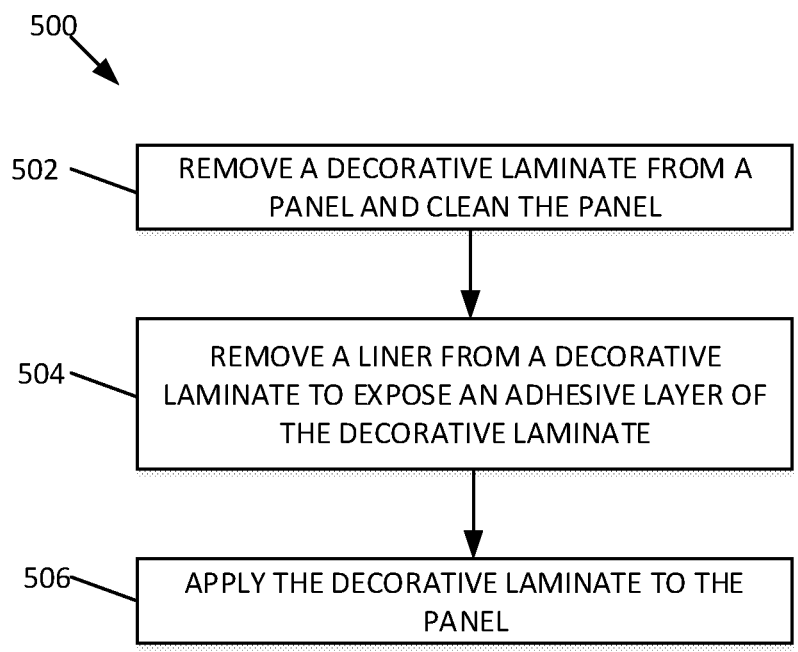
FIG. 5 is a flowchart representative of an example method to apply the example decorative laminate of FIG. 1 to an example panel.

FIG. 5 is a flowchart representative of an example method 500 that may be performed to apply a decorative laminate, such as the example decorative laminate 100 of FIGS. 1-3, to a panel. In some examples, the panel may have a previously applied decorative laminate that is to be replaced. In such an example, the example method 500 includes removing a previously applied decorative laminate from a panel and cleaning the panel (e.g., a top surface of the panel) (block 502). In some examples, this process is performed by a technician or operator.

In some examples, the new decorative laminate includes a liner or backing that is to be removed before application. In such an example, the example method 500 includes removing the liner on the decorative laminate to expose an adhesive layer of the decorative laminate (block 504). For example, referring back to FIG. 3, the decorative laminate 100 includes the liner 300 covering the adhesive layer 108. The liner 300 may be peeled away to expose the adhesive layer 108. In other examples, the decorative laminate 100 may be provided without a liner. In such an example, the adhesive layer 108 may already be exposed.

The example method 400 further includes applying the decorative laminate to the panel (block 506). For example, referring back to FIG. 2, the decorative laminate 100 may be applied to the panel 102, such that the adhesive layer 108 contacts the panel 102 and couples the decorative laminate 100 to the panel 102. In some examples, the combination of the decorative laminate 100 and the panel 102 form a decorative laminate panel. In some examples, the decorative laminate 100 is applied to a panel already in place (e.g., in the interior cabin of an aircraft). In other examples, the decorative laminate 100 is applied to a panel and then the panel is installed in the corresponding structure.

From the foregoing, it will be appreciated that the above disclosed decorative laminates achieve better results than the known decorative laminates. The open-cell foam layer of the disclosed decorative laminates provides sufficient gas venting while still maintaining the structural integrity of the foam to prevent ripping or tearing. For example, when implemented as decorative laminates in aircraft, the example decorative laminates and methods disclosed herein greatly reduce and/or eliminate the need to replace bubbled decorative laminates in final assembly, on the flight line and/or after an aircraft is in-service, thereby greatly reducing costs. Additionally, customer satisfaction is improved as the example decorative laminates do not bubble in-service. Further, the example decorative laminates are simpler and cheaper to manufacture, as they require less manufacturing processes than known decorative laminates.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a panel to be disposed in a cabin of an aircraft, the panel constructed of material that outgasses over time; and
a decorative laminate coupled to the panel, the decorative laminate including:
a decorative layer;
an open-cell foam layer having a first side and a second side opposite the first side, the decorative layer coupled to the first side of the open-cell foam layer, the open-cell foam layer constructed of open-cell metal foam or open-cell ceramic foam with cells having a size up to approximately 6.35 millimeters (mm); and
a pressure sensitive adhesive layer coupled to the second side of the open-cell foam layer such that the open-cell foam layer is disposed between the decorative layer and the pressure sensitive adhesive layer, the pressure sensitive adhesive coupled to the panel, the pressure sensitive adhesive layer including venting pathways extending randomly through a thickness of the pressure sensitive adhesive layer, such that air disposed between the decorative laminate and the panel when the decorative laminate is coupled to the panel and gas vented from the panel after the decorative laminate is coupled to the panel is vented through the pressure sensitive adhesive layer and the open-cell foam layer to an edge of the open-cell foam layer to atmosphere to prevent bubbles from forming between the decorative laminate and the panel over time.

2. The apparatus of claim 1, wherein the cells have a size of approximately 1 nanometer to approximately 1 millimeter.

3. The apparatus of claim 1, wherein an open-cell content of the open-cell foam layer is approximately 10% to approximately 100%.

4. The apparatus of claim 1, wherein a void fraction of the open-cell foam layer is approximately 10% to approximately 98%.

5. An aircraft comprising:
a cabin; and
the apparatus of claim 1 disposed in the cabin.

6. The apparatus of claim 1, wherein the pressure sensitive adhesive layer includes fibers, the venting pathways formed in the pressure sensitive adhesive layer adjacent the fibers.

7. The apparatus of claim 1, wherein the pressure sensitive adhesive layer includes particulate, the venting pathways formed in the pressure sensitive adhesive layer adjacent the particulate.

8. The apparatus of claim 1, wherein the decorative layer defines an outermost layer of the decorative laminate, the decorative layer including an embossing resin layer, a top sheet layer, and an ink composition layer between the embossing resin layer and the top sheet layer, the embossing resin layer of the decorative layer coupled to the first side of the open-cell foam layer, the top sheet layer being at least partially transparent, such that the ink composition layer is visible through the top sheet layer to provide a decorative effect to the panel.

9. The apparatus of claim 8, wherein the embossing resin layer is constructed of a low heat release resin, a thermosetting resin, or a thermoplastic resin.

10. The apparatus of claim 8, wherein the top sheet layer is constructed of a transparent thermoplastic polymer.

11. A method of manufacturing an apparatus, the method comprising:
producing a decorative laminate including:
coupling a decorative layer to a first side of an open-cell foam layer, the open-cell foam layer constructed of open-cell metal foam or open-cell ceramic foam with cells having a size up to approximately 6.35 millimeters (mm); and
coupling a pressure sensitive adhesive layer to a second side of the open-cell foam layer opposite the first side of the open-cell foam layer such that the open-cell foam layer is disposed between the decorative layer and the pressure sensitive adhesive layer, the pressure sensitive adhesive layer including venting pathways extending randomly through a thickness of the pressure sensitive adhesive layer; and
applying the decorative laminate to a panel to be disposed in a cabin of an aircraft by contacting the pressure sensitive adhesive layer with the panel, the panel constructed of material that outgasses over time, wherein air disposed between the decorative laminate and the panel when the decorative laminate is coupled to the panel and gas vented from the panel after the decorative laminate is coupled to the panel is vented through the pressure sensitive adhesive layer and the open-cell foam layer to an edge of the open-cell foam layer to atmosphere to prevent bubbles from forming between the decorative laminate and the panel over time.

12. The method of claim 11, wherein the cells have a size of approximately 1 nanometer to approximately 1 millimeter.

13. The method of claim 11, wherein an open-cell content of the open-cell foam layer is approximately 10% to approximately 100%.

14. The method of claim 11, wherein a void fraction of the open-cell foam layer is approximately 10% to approximately 98%.

15. The method of claim 11, wherein the decorative layer defines an outermost layer of the decorative laminate, the decorative layer including an embossing resin layer, a top sheet layer, and an ink composition layer between the embossing resin layer and the top sheet layer, the embossing resin layer of the decorative layer coupled to the first side of the open-cell foam layer, the top sheet layer being at least partially transparent, such that the ink composition layer is visible through the top sheet layer to provide a decorative effect to the panel.

16. The method of claim 15, wherein the embossing resin layer is constructed of a low heat release resin, a thermosetting resin, or a thermoplastic resin.

17. The method of claim 11, wherein the pressure sensitive adhesive layer includes fibers, the venting pathways formed in the pressure sensitive adhesive layer adjacent the fibers.

18. The method of claim 11, wherein the pressure sensitive adhesive layer includes particulate, the venting pathways formed in the pressure sensitive adhesive layer adjacent the particulate.

19. The method of claim 11, further including, prior to applying the decorative laminate to the panel, removing a liner from the adhesive layer.

20. The method of claim 19, wherein the liner is constructed of at least one of paper, plastic film, or poly coated paper.

* * * * *